United States Patent [19]

Fenton

[11] 3,726,925

[45] Apr. 10, 1973

[54] PREPARATION OF TRIALKYLAMINES

[75] Inventor: Donald M. Fenton, Anaheim, Calif.

[73] Assignee: Union Oil Company, Los Angeles, Calif.

[22] Filed: June 24, 1970

[21] Appl. No.: 49,503

[52] U.S. Cl. .........260/583 R, 252/431 R, 252/431 P
[51] Int. Cl. ..........................C07c 85/00, C07c 85/02
[58] Field of Search ................................260/583 R; 252/431 P

[56] References Cited

UNITED STATES PATENTS

| | | | |
|---|---|---|---|
| 3,513,200 | 5/1970 | Biale | 260/583 R |
| 1,857,655 | 5/1932 | Nicodemus et al. | 260/583 R |
| 3,110,747 | 11/1963 | Mullineaux | 252/431 P X |
| 3,394,187 | 7/1968 | Markiewitz | 260/583 R |
| 3,454,644 | 6/1969 | Dewhirst | 260/583 K X |
| 3,493,617 | 2/1970 | Shryne et al. | 252/431 P X |

FOREIGN PATENTS OR APPLICATIONS

| 629,256 | 4/1936 | Germany | 260/583 R |
|---|---|---|---|

Primary Examiner—Lewis Gotts
Assistant Examiner—Richard L. Raymond
Attorney—Milton W. Lee, Richard C. Hartman, Lannas S. Henderson, Dean Sandford, Robert E. Strauss and Stuart W. Knight

[57] ABSTRACT

A trialkylamine is prepared by contacting a dialkylamine with a liquid reaction medium containing a ruthenium, osmium, rhenium or technetium metal catalyst, preferably in complex association with a biphyllic ligand at a temperature of 50°–400° C. A typical reaction comprises contacting dibutylamine with ruthenium trichloride and triphenylphosphine to produce tributylamine and butylamine.

9 Claims, No Drawings

PERFORATION OF TRIALKYLAMINES

DESCRIPTION OF THE INVENTION

The invention relates to the preparation of trialkylamines. More particularly, the invention relates to preparation of trialkylamines and monoalkylamines from dialkylamines.

It is known that trialkylamines may be produced by reacting an alkylamine with an alkyl halide to produce a tetraalkylammonium halide which is contacted with sodium hydroxide to produce the trialkylamine. An alkyl halide is consumed with the halide converted to a salt which is essentially a wasteful by-product. A process for producing a dialkylamine from an alkylamine is known in the art and comprises heating a monoalkylamine in the presence of a dehydrogenation catalyst to produce a dialkylamine. Hence, if the dialkylamine can be conveniently converted to a trialkylamine, a trialkylamine can be prepared from a monoalkylamine without the consumption of an alkyl halide.

According to the invention, the dialkylamine is converted to a trialkylamine according to the following equation:

$$2 R_2NH \rightarrow R_3N + RNH_2$$

A monoalkylamine is formed as a by-product of the above reaction and can be recycled to the process wherein a monoalkylamine is contacted with a dehydrogenation catalyst to form the dialkylamine. Hence, the process of the invention may be combined with the aforementioned prior art process to convert a monoalkylamine to a trialkylamine.

The amine reactant of the invention is a dialkylamine having 2 to 24 carbons, preferably 2 to 14 carbons and is exemplified by dimethylamine, diethylamine, dipropylamine, dibutylamine, diisobutylamine, dipentylamine, di-2-butylnonylamine, dioctylamine, didecylamine, didodecylamine, ditetradecylamine, butyloctylamine, pentylhexylamine, butylnonylamine, pentyldodecylamine, nonyldecylamine, 2-butyldecylhexylamine, etc.

The preferred amines are the dialkyl fatty or straight-chain amines, e.g., di-n-ethylamine, di-n-butylamine, di-n-pentylamine, etc. Also, it is preferred that the alkyl groups of the amine be the same.

The catalyst of the invention may be ruthenium, osmium, rhenium or technetium, preferably ruthenium. A minor amount of the catalyst is used, e.g., 0.001–5 weight percent, preferably 0.001–2 percent calculated as the metal and based on the reaction medium. The metal may be added as a salt, complex, acid, or oxide preferably as a salt such as a halide (chloride, bromide, iodide, or fluoride), hydroxide, cyanide, nitrate, sulfate, carbonate, or $C_1$–$C_5$ carboxylate. The metal may also be added as a free metal providing the reaction medium includes a complexing agent or anion, such as the aforementioned anions, ammonia, $C_2$–$C_{15}$ alkylene diamine, e.g., ethylene diamine, propylene diamine, butylene diamine, nonylene diamine, etc., or $C_1$–$C_5$ primary or secondary alkyl amine, carbon monoxide, a halogen, hydrogen, or a biphyllic ligand as will be described hereinafter. Preferably, the catalyst is added as a halide; preferably chloride. Suitable sources of the metal catalyst include ruthenium tetrachloride, ruthenium trichloride, ruthenium cyanide, ruthenium pentacarbonyl, ruthenium carbonyl hydride, ruthenium nitrate, ruthenium hydroxide, ruthenium sulfide, tetraaminorutheniumhydroxychloro chloride, ruthenium acetate, ruthenium benzoate, osmium dichloride, osmium iodide, osmium oxide, osmium nitrate, osmium sulfite, chloroosmic acid, osmium valerate, osmium sulfate, tetraaminoosimiuhydroxy chloride, ruthenium bromide, rhenium pentacarbonyl, rhenium chloride, rhenium dioxide, rhenium heptoxide, rhenium sulfide, trimethylrhenium, dipyridyl perrhenate, technetium chloride, technetium nitrate, technetium oxide, etc. The particular method by which the metal is added to the reaction medium is not the essence of the invention nor particularly critical to the reaction.

The process is preferably conducted in the presence of a biphyllic ligand which forms a complex with and stabilizes the aforementioned catalyst. Use of a biphyllic ligand is, however, not essential to the process. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein
E is trivalent phosphorus, arsenic antimony or bismuth; and wherein
R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, exyly, duryl, etc. Preferably at least one R is aryl, e.g., phenyl, tolyl, xylyl, etc., and, most preferably, the ligand is triaryl.

Examples of suitable biphyllic ligands having the aforementioned structures and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)-phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentylixylylstibine, dioctylphenylphosphine, tridurylphosphine, tricumenylphosphine, trixylylbismuthine, etc. Of the aforementioned, the mono-, di- and tri- aryl phosphines, particularly the triarylphosphines (e.g., triphenylphosphine), are preferred because of their greater activity.

The catalyst may be complexed with the above-described biphyllic ligand before being introduced into the reaction medium or the complex may be formed "in situ" by simply adding the metal and the biphyllic ligand directly into the reaction medium. In either case, it is generally preferable that the quantity of biphyllic ligand be in excess, e.g., 10–300 percent of that stoichiometrically required to form a complex with the metal and is generally 0.01–10 weight percent of the reaction medium. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc., may be but need not be included in the complex catalyst of this invention. These components may be incorporated in the catalyst by the formation of the catalyst complex from a metal salt of the indicated anions. A preferred complex is one comprising at least one halide ligand, e.g., acetate, propionate, butyrate, benzoate, etc., since these groups, particularly the halides, improve the activity of the catalyst. Ammonia or the amine reactant and/or product can also be a ligand in association with the metal catalyst, alone or with one or more of the aforementioned biphyllic ligands.

The process is preferably conducted in the presence of 0.01–10 weight percent, preferably 0.01–5 percent of a strong base such as the alkali or alkaline earth metal hydroxides, e.g., sodium hydroxide, potassium hydroxide, lithium hydroxide, calcium hydroxide, magnesium hydroxide, etc. Since the nitrogen containing reactant and the product are alkaline, the addition of further alkaline agents is not essential to operability but is only preferred for maximum activity.

The reaction is performed under liquid phase conditions. When the reactants and/or product are liquids under the reaction conditions, they can form the desired liquid phase and be diluted, if desired, with a suitable inert organic liquid, preferably a liquid which is a solvent for the reactants and catalyst. Suitable liquids include the saturated and aromatic hydrocarbons which are exemplified by hexane, heptane, octane, benzene, toluene, cyclohexane, cyclodecane, etc.

The liquid phase can also be formed simply by use of an excess of the reactant amine if a liquid, e.g., 2–100 times that stoichiometrically required for the reaction. This can be accomplished by discontinuing the reaction before complete consumption of the amine.

The process may be conducted at mild conditions such as temperatures of 50°–400° C., preferably 80°–250b$L$ C. and pressures of 1–70 atmospheres absolute, preferably 1–30 atmospheres and sufficient to maintain liquid phase conditions. The desired pressure may be maintained by adding an inert gas, e.g., nitrogen, to the reaction mixture, however, addition of an inert gas is generally not required.

The reaction can be preformed batchwise or in a continuous fashion. When operating batchwise, the catalyst, reaction medium and the amine, if a liquid, and the strong base, if utilized, and can be introduced in the reaction zone to form a liquid phase therein. The reaction zone can be heated to the desired reaction temperature by preheating the liquid so introduced or by use of heating means in the reactor. In the case where an inert gas it utilized, the inert gas can be introduced to maintain the desired reaction pressure. When performing the reaction in a continuous fashion, the dialkylamine reactant can be continuously introduced into the reaction zone to contact the reaction medium containing the catalyst.

The trialkylamine product can be recovered from the reaction zone by periodically or continuously withdrawing at least a portion of the liquid reaction medium and the amine may be recovered therefrom by conventional separation processing such as distillation. The remainder of the reaction medium may be recycled to the reaction zone. Unreacted dialkylamine and/or the inert gas, if utilized, may be taken overhead and recycled to the reaction zone. The by-product monoalkylamine may be converted to a dialkylamine by the aforementioned process for further utilization in the process of the invention.

EXAMPLE 1

The following examples illustrate the invention and demonstrate the results actually obtained:

To a 250 milliliter flask was added ½ gram ruthenium-trichloride, 3 grams triphenylphosphine, 2 grams potassium hydroxide and 100 milliliters dibutylamine. The flask was heated to and maintained at reflux (about 200° C.) for about 24 hours. The liquid contents were removed to reveal that tri-n-butylamine and n-butylamine were formed in the process.

To a 300 milliliter rocker bomb were added ½ gram ruthenium trichloride, 3 grams triphenylphosphine, 50 milliliters of dibutylamine and 10 milliliters of water. The bomb was pressured with nitrogen to about 14 atmospheres and heated to and maintained at 175° C. for 2 hours and at 225° C. for a second 2 hours. The liquid contents were removed and 5 grams of tributylamine and 2 grams of butylamine recovered.

To the 300 milliliter rocker bomb were added ½ gram ruthenium trichloride, 4 grams triphenylphosphine, and 50 milliliters dibutylamine. The bomb was pressured with ethylene to about 54 atmospheres and heated to and maintained at 125° C. for 2 hours and 200° C. for a second 2 hours. The liquid contents were removed to reveal that 8 grams of tributylamine and 4 grams of butylamine were formed.

To a 250 milliliters flask were added ½ gram ruthenium trichloride, 4 grams triphenylphosphine, and 50 milliliters of dibutylamine. The flask was heated to reflux for 6 hours. The liquid contents were removed to reveal that 8 grams tributylamine and 1 gram butylamine were formed in the process.

EXAMPLE 2

The following examples illustrate other modes of practice presently contemplated:

To a flask are added 1 gram ruthenium hydroxide, 5 grams tricyclohexylstibine and 200 milliliters of didodecylamine. The flask is heated to about 250° C. for 6 hours. The liquid contents are removed and tridedecylamine recovered therefrom.

To a 250 milliliter flask are added 2 grams osmium dichloride and 150 milliliters butyloctylamine. The flask is heated to and maintained at about 250° C. for 10 hours. The liquid contents are removed and dibutyloctylamine and octylamine recovered therefrom.

To a flask are added ½ gram rhenium pentacarbonyl, 5 grams tributylarsine and 100 milliliters dipentylamine. The flask is heated to and maintained at reflux for 10 hours. The liquid contents are removed and tripentylamine recovered by distillation. The pentylamine by-product is transferred to a reactor where it contacts a Raney nickel dehydrogenation catalyst at about 200° C. to form dipentylamine which is recycled to the above reaction zone to contact the rhenium catalyst and to form triphentylamine.

I claim:

1. The process the preparation of a trialkylamine comprising contacting a dialkylamine having 2 to 24 carbons with a liquid reaction medium comprising 0.001–5 weight percent of a complex of ruthenium with a biphyllic ligand having the structure:

$$ER_3$$

wherein
  E is trivalent phosphorus, arsenic, antimony or bismuth; and
wherein
  R is the same or different alkyl having 1 to about 10 carbons, cycloalkyl having 4 to about 10 carbons, or aryl having 6 to about 10 carbons; at reaction conditions sufficient to form said trialkylamine by maintaining a temperature of 50°–400°C. and a pressure of 1–200 atmospheres sufficient to maintain liquid phase.

2. The process of claim 1 wherein at least one of said R groups of said ligand is monocyclic aryl.

3. The process of claim 1 wherein at least two of said R groups of said ligand are monocyclic aryl.

4. The process of claim 1 wherein said biphyllic ligand is a triarylphosphine.

5. The process of claim 4 wherein said biphyllic ligand is triphenylphosphine.

6. The process of claim 4 wherein the trialkylamine is a fatty amine having 2 to about 14 carbons.

7. The process of claim 1 wherein said dialkylamine is dibutylamine.

8. The process of claim 1 wherein said temperature is maintained at 80°–250° C.

9. The process of claim 1 wherein said pressure is maintained at 1 to 30 atmospheres.

* * * * *